Dec. 15, 1964  C. H. GOLDINGAY  3,161,548
MEANS FOR CLOSING THE FILLING ORIFICES
OF ELECTRIC STORAGE BATTERIES
Filed June 29, 1961  3 Sheets-Sheet 1

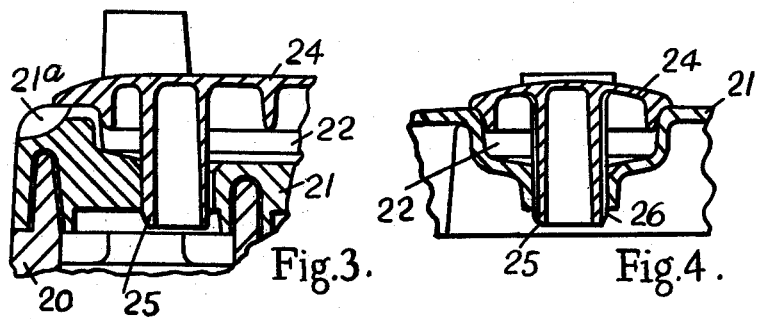
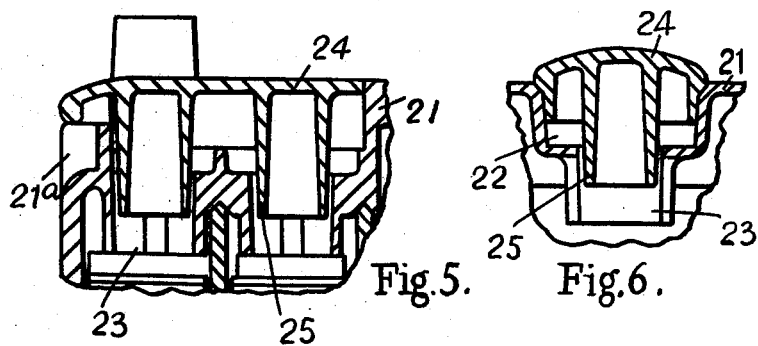
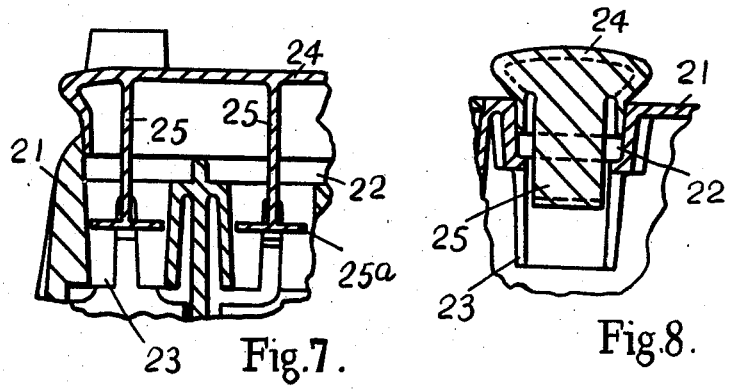

United States Patent Office 3,161,548
Patented Dec. 15, 1964

3,161,548
MEANS FOR CLOSING THE FILLING ORIFICES OF ELECTRIC STORAGE BATTERIES
Charles H. Goldingay, Solihull, England, assignor to Joseph Lucas (Industries) Limited, Birmingham, England
Filed June 29, 1961, Ser. No. 120,633
2 Claims. (Cl. 136—177)

The object of this invention is to provide in a convenient form means for closing the filling orifices of a multi-cell electric storage battery such as is used on road vehicles.

Means according to the invention comprises the combination of a battery lid having formed in its upper surface an elongated recess in the base of which the filling orifices are formed, a separable cover piece adapted to extend over and be retained relative to the recess, and baffle means on the cover piece which are adapted to extend into the filling orifices.

Figure 1:
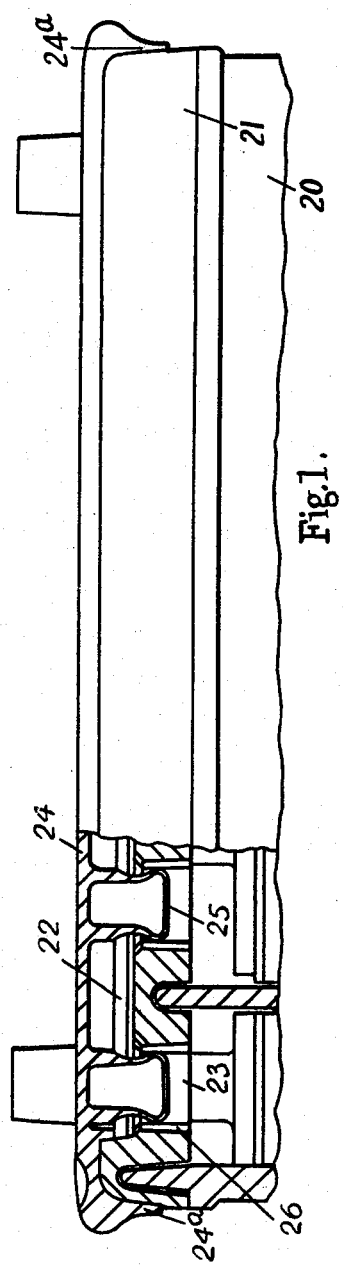
Figure 2:
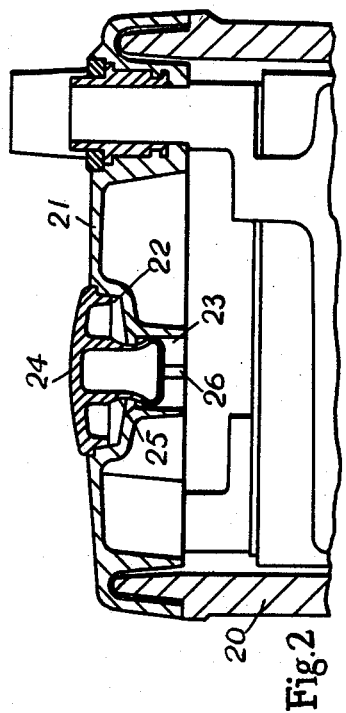
Figures 9, 10:
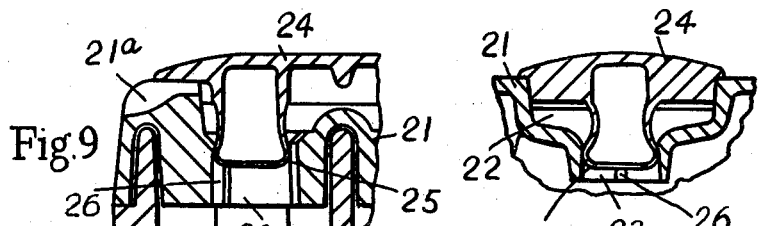
Figures 11, 12:
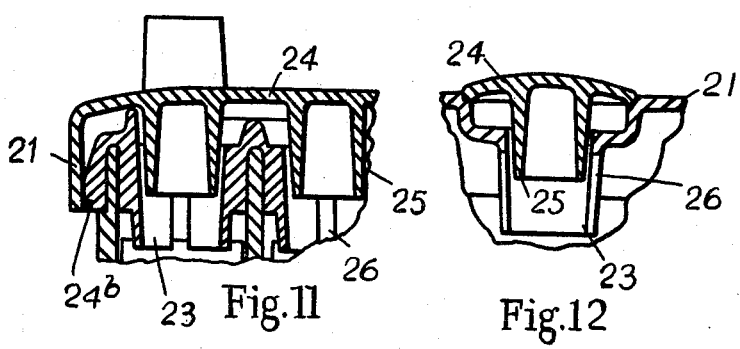
Figures 13, 14:
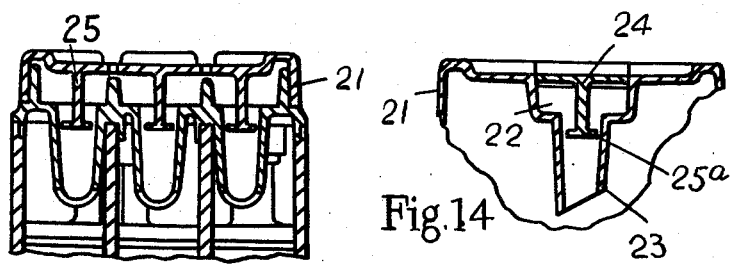

In the accompanying drawings FIGURES 1 and 2 respectively are a part sectional side view and a sectionalened view of the upper part of a battery incorporating one example of the invention, and FIGURES 3 and 4 respectively, FIGURES 5 and 6 respectively, FIGURES 7 and 8 respectively, FIGURES 9 and 10 respectively, FIGURES 11 and 12 respectively, and FIGURES 13 and 14 respectively are fragmentary sectional side and end views showing further examples of the invention.

Referring to the drawings the battery 20 has a moulded lid 21 in the upper surface of which is formed an elongated and longitudinally extending recess 22. In the base of the recess 22 are formed the filling orifices 23 for the plurality of cells of the battery.

Associated with the lid 21 is a separable cover piece 24, which, when in position, extends over the recess 22 in spaced relationship to its base. Conveniently, the cover piece 24 is formed from rubber, plastic or other resilient material so as to be self-retaining when engaged with the recess 22. For example, it may be of channel shape and arranged so that the walls of the channel will fit within and resiliently bear against the sides of the recess as shown in FIGURES 2, 4, 6 or 8. Alternatively, it may be of strip-like form arranged so as to be a push fit within the recess 22 with its side edges bearing resiliently against the sides of the recess as shown in FIGURES 10, 12 or 14. Alternatively or additionally the ends of the cover piece 24 may be provided with flange-like parts 24ᵃ adapted to embrace and grip the ends of the lid, as shown in FIGURES 1, 11 and 13. Moreover, such flange-like parts may have projections 24ᵇ adapted to engage under shoulders on the lid 21 to retain the cover piece firmly in position.

Where the cover piece is not provided with a flange-like part the ends of the lid 21 may be recessed as shown at 21ᵃ in FIGURES 3, 5 and 9 to enable an individual to engage his/her finger under an end of the cover piece to facilitate its removal.

On the underside of the cover piece are formed a plurality of integral baffles 25 which are adapted to extend into the filling orifices 23 when the cover piece is in position on the lid. These baffles may be in the form of hollow spigots as shown in FIGURES 3, 4, 5, 6, 11, 12, or may be strip-like pieces carrying circular disc-like heads 25ᵃ at their outer ends as shown in FIGURES 7, 8, 13 and 14, there being sufficient clearance provided between the heads and the walls of the orifices to enable gas to escape.

In a further construction the baffles 25 are in the form of hollow bulbous plugs as shown in FIGURES 1, 2, 9, 10, which can be forced into the orifices 23, and which by virtue of their resilient grip therein may serve to retain the cover piece in position on the lid. In the cases of the baffles being in the form of spigots or plugs grooves 26 are provided in the walls of the filling orifices (see FIGURES 1, 2, 9, 10, 11 and 12) or in the spigots (see FIGURES 3 and 4) to permit escape of gas around the baffles.

By constructions as above described, gases can escape from the cells into the recess 22 and thence, either through vents in the cover piece, or through gas gaps between the cover and lid to atmosphere. Any acid, however, which manages to pass the baffles will tend to collect in the recess and drain back into the cells past the baffles.

Having thus described my invention what I claim as new and desire to secure by Letters Patent is:

1. Means for closing plural filling orifices of a multi-cell electric storage battery comprising in combination a hollow battery casing, a lid on the casing and having formed in its upper surface an elongated recess in the base of which the filling orifices are formed, a separable unitary cover piece adapted to extend over the recess to define, with the recess, a cavity, plural baffle means formed integrally with the cover piece and adapted to extend into the filling orifices respectively, and means for resiliently retaining said cover piece relatively to the recess, the orifices and baffles defining between them passage means affording communication between said cavity and the interior of the battery casing.

2. Means as claimed in claim 1 in which the cover piece is formed from resilient material and is provided with portions resiliently engaging the walls of said recess whereby said cover piece is retained in position.

References Cited by the Examiner
UNITED STATES PATENTS
2,890,262   6/59   Kendall et al.

FOREIGN PATENTS
836,944   6/60   Great Britain.
644,420   10/50   Great Britain.
117,040   8/46   Sweden.

JOHN H. MACK, Primary Examiner.
JOHN R. SPECK, Examiner.